US009079566B2

(12) United States Patent
Belanger et al.

(10) Patent No.: US 9,079,566 B2
(45) Date of Patent: Jul. 14, 2015

(54) ABSORBENT MEDIA ELEMENT FOR A VEHICLE WASH COMPONENT

(71) Applicants: Michael J. Belanger, Northville, MI (US); Barry S. Turner, Novi, MI (US); Thomas E. Weyandt, Northville, MI (US); Jerry A. Kotrych, Livonia, MI (US)

(72) Inventors: Michael J. Belanger, Northville, MI (US); Barry S. Turner, Novi, MI (US); Thomas E. Weyandt, Northville, MI (US); Jerry A. Kotrych, Livonia, MI (US)

(73) Assignee: Belanger, Inc., Northville, MI (US)

( * ) Notice: Subject to any disclaimer, the term of this patent is extended or adjusted under 35 U.S.C. 154(b) by 236 days.

(21) Appl. No.: 13/842,738

(22) Filed: Mar. 15, 2013

(65) Prior Publication Data

US 2014/0259727 A1 Sep. 18, 2014

(51) Int. Cl.
*F26B 11/02* (2006.01)
*B60S 3/00* (2006.01)
*B60S 3/06* (2006.01)
*A46B 13/00* (2006.01)

(52) U.S. Cl.
CPC ............... *B60S 3/002* (2013.01); *A46B 13/006* (2013.01); *B60S 3/06* (2013.01); *A46B 2200/3046* (2013.01)

(58) Field of Classification Search
CPC .............. F26B 3/00; F26B 5/00; F26B 11/00; F26B 11/1102; A46B 13/00; A46B 13/02
USPC ............. 34/90, 104, 105, 201, 210, 218, 666, 34/355, 380, 381; 15/159.1, 104.93, 15/104.94, 209.1, 244.1
See application file for complete search history.

(56) References Cited

U.S. PATENT DOCUMENTS

| | | | |
|---|---|---|---|
| 3,693,206 A * | 9/1972 | Tatara et al. ................... | 15/53.3 |
| 4,009,303 A * | 2/1977 | Faris ............................. | 427/287 |
| 4,024,598 A * | 5/1977 | Miner ............................ | 15/53.2 |
| 5,012,360 A * | 4/1991 | Yamauchi et al. ......... | 360/99.15 |
| 5,134,742 A | 8/1992 | Ennis | |
| 5,784,748 A | 7/1998 | Belanger et al. | |
| 6,532,615 B2 | 3/2003 | Clark | |
| 7,743,454 B2 | 6/2010 | Favagrossa | |

(Continued)

FOREIGN PATENT DOCUMENTS

| | | | | |
|---|---|---|---|---|
| EP | 667268 A2 * | 8/1995 | ............... | B60S 3/06 |
| EP | 1394294 A1 * | 3/2004 | ............... | D01F 6/14 |

(Continued)

OTHER PUBLICATIONS

Partial Machine Translation of JP 2001-18767, Jan. 23, 2001.

*Primary Examiner* — Stephen Gravini
(74) *Attorney, Agent, or Firm* — Dickinson Wright PLLC

(57) ABSTRACT

A component for removing water from a vehicle exterior in a vehicle wash process includes a base portion for supporting the component adjacent a path of travel of a vehicle. The base portion is connected to a frame portion and the frame portion is configured to move with respect the vehicle as the vehicle passes the component. The frame portion is in communication with a control mechanism which automatically directed the frame portion to move as the vehicle nears the frame portion to effectuate the removal of water from the vehicle exterior. The frame portion includes a plurality of media elements in communication therewith and configured to contact a vehicle exterior to remove excess water therefrom. At least a portion of each of the plurality of media elements consists of an absorbent polyvinyl alcohol material.

22 Claims, 7 Drawing Sheets

(56) References Cited

U.S. PATENT DOCUMENTS

| | | |
|---|---|---|
| 7,805,798 B2 * | 10/2010 | Belanger .................... 15/230.16 |
| 8,495,786 B2 | 7/2013 | Naftal |
| 2004/0200024 A1 | 10/2004 | Yamin |
| 2005/0235443 A1 * | 10/2005 | Mathys et al. ................. 15/97.3 |
| 2006/0207047 A1 | 9/2006 | Weyandt |
| 2007/0151054 A1 * | 7/2007 | MacNeil ....................... 15/53.2 |
| 2008/0078048 A1 | 4/2008 | Belanger |
| 2009/0217944 A1 * | 9/2009 | Munera et al. .................... 134/6 |
| 2009/0250086 A1 * | 10/2009 | Belanger et al. ............ 134/57 R |
| 2009/0250993 A1 | 10/2009 | Vivyan et al. |
| 2010/0170543 A1 * | 7/2010 | Wimmer et al. .............. 134/123 |
| 2011/0138558 A1 * | 6/2011 | Favaqgrossa ................... 15/160 |
| 2011/0247161 A1 * | 10/2011 | Botella Pla et al. ............. 15/179 |
| 2013/0019419 A1 * | 1/2013 | Favagrossa .................... 15/53.1 |
| 2013/0180064 A1 * | 7/2013 | Belanger et al. ............... 15/53.1 |
| 2014/0259502 A1 * | 9/2014 | Vitucci-Schneider ....... 15/244.4 |
| 2014/0259727 A1 * | 9/2014 | Belanger et al. ................. 34/355 |
| 2014/0283320 A1 * | 9/2014 | Tyrrell et al. ................. 15/159.1 |

FOREIGN PATENT DOCUMENTS

| | | |
|---|---|---|
| JP | 410244911 A | 9/1998 |
| JP | 2001018767 A | 1/2001 |
| JP | 2005170221 A | 6/2005 |
| JP | 2007260379 A | 10/2007 |
| JP | 2008061723 A | 3/2008 |
| JP | 2009055960 A | 3/2009 |

* cited by examiner

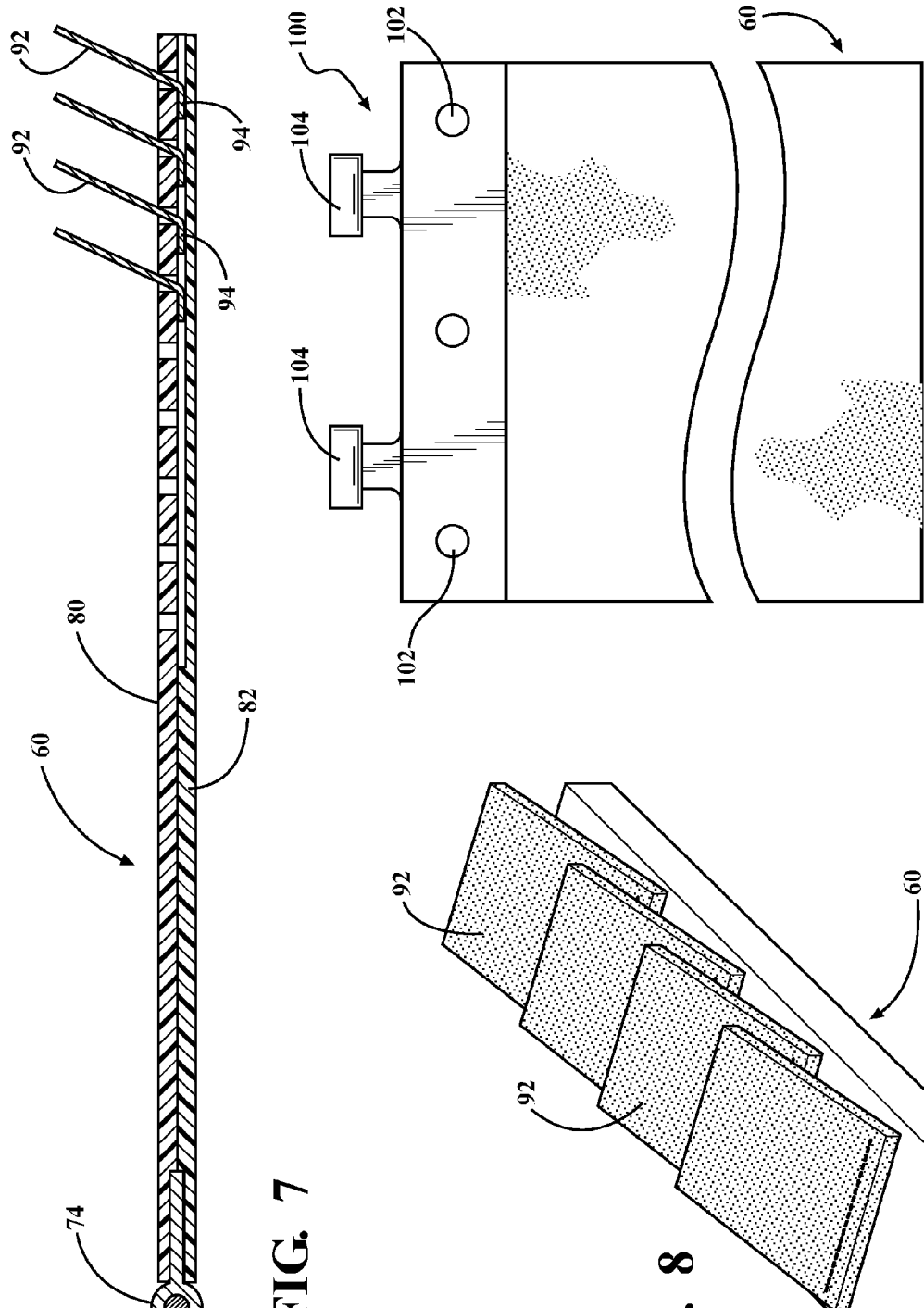

ABSORBENT MEDIA ELEMENT FOR A VEHICLE WASH COMPONENT

BACKGROUND OF THE INVENTION

1. Field of the Invention

The present disclosure relates generally to a media element for use in a vehicle wash process. More particularly, the present disclosure relates to a media element for a vehicle wash component that provides significantly more absorbent capabilities than existing media elements and reduces the cost to perform the vehicle drying operation.

2. Description of the Prior Art

Vehicle wash systems generally include a drying system for removing water from a vehicle exterior after completion of the washing and rinsing processes. There are two general types of drying systems employed as part of conventional vehicle wash systems.

The first type of drying system includes one or more blower assemblies located in the vehicle wash system after the wash and rinse functions have been completed. The blower assemblies impart a fluid force on the vehicle exterior surface in an attempt to forceably remove any moisture from the vehicle exterior surface prior to the vehicle exiting the vehicle wash facility. This type of drying system requires a large air velocity to remove the water, which can create undesirable noise. Also, achieving the necessary large air velocity requires a significant amount of energy as well as a large amount of space, which are both at a premium in typical vehicle wash systems.

The second type of drying system utilizes one or more vehicle wash components having a plurality of media elements that contact the vehicle exterior to remove excess water after the vehicle has been fully washed and rinsed. The media elements are typically made from a cloth material and are designed to remove water both by absorption as well as by pushing or slapping the water off of the vehicle exterior as the media elements move. The vehicle wash components are generally a miter curtain or a rotary brush that translates the media elements with respect to the surface of the vehicle. This type of drying system is generally limited by the absorption capabilities of the media elements. Additionally, the vehicle wash components are generally operated at high speeds to increase the removal of excess water from the vehicle exterior as well as to help remove water from the media elements themselves and thereby improve their absorption capabilities. However, a drying system that causes the media elements to contact a vehicle surface at high speeds is undesirable for many vehicle owners due to the propensity for scratching, micro-hazing and/or other damage to the vehicle exterior that can result from contact with media elements.

While existing drying systems operate satisfactorily, they are not capable of removing enough of the excess water from the vehicle. Consequently, conventional vehicle wash systems typically employ a hand drying process after the vehicle has exited the wash system to manually remove any excess water from the vehicle exterior. The process generally employs soft towels, such as terrycloth towels. While this satisfactorily removes the excess water that remains on the vehicle exterior, it is can be a time consuming and labor intensive process that increases the cost to the vehicle wash operator and the consumer. Also, many vehicle wash facilities do not have enough space to perform this secondary drying process.

It would thus be desirable to provide a drying system for a vehicle wash component that overcomes these disadvantages with existing drying systems.

SUMMARY OF THE INVENTION

It is therefore an aspect of the present disclosure to provide a drying system for a vehicle wash process that removes an increased amount of excess water from a vehicle exterior.

It is another aspect of the present disclosure to provide a drying system for a vehicle wash process that utilizes less energy than prior drying systems.

It is still another aspect of the present disclosure to provide a drying system for a vehicle wash process that decreases the cost of operation to the vehicle wash operator as compared to prior drying systems.

It is a further aspect of the present disclosure to provide a drying system for a vehicle wash process that eliminates the need for manual hand drying at the conclusion of the vehicle wash process.

It is still a further aspect of the present disclosure to provide a drying system that automates the manual hand drying process employed with existing systems.

It is yet another aspect of the present disclosure to provide a drying system that generates less noise than prior systems.

In accordance with the above and the other aspects of the present disclosure, a component for removing water from a vehicle exterior in a vehicle wash process is provided. The component includes a base portion supporting the component adjacent a path of travel of a vehicle. The base portion is connected to a frame portion, which is configured to move with respect the vehicle as the vehicle passes the component. The frame portion is in communication with a control which automatically directs the frame portion to move as the vehicle nears the frame portion to effectuate the removal of water from the vehicle exterior. The frame portion includes a plurality of media elements in communication therewith and which are configured to contact a vehicle exterior to remove excess water therefrom. Each of the plurality of media elements includes a portion consisting of an absorbent polyvinyl alcohol material.

BRIEF DESCRIPTION OF THE DRAWINGS

Other advantages of the present disclosure will be readily appreciated, as the same becomes better understood by reference to the following detailed description when considered in connection with the accompanying drawings wherein:

FIG. 7 is a cross-sectional view of a media element for vehicle drying component in accordance with an aspect of the disclosure;

FIG. 8 is an enlarged view of the treatment portion of a media element for a drying system component in accordance with another aspect of the disclosure;

FIG. 9 is a perspective view of a keyhole attachment part for securing a media element to a vehicle drying component in accordance with an aspect of the disclosure.

DETAILED DESCRIPTION OF THE INVENTION

Figure 1:
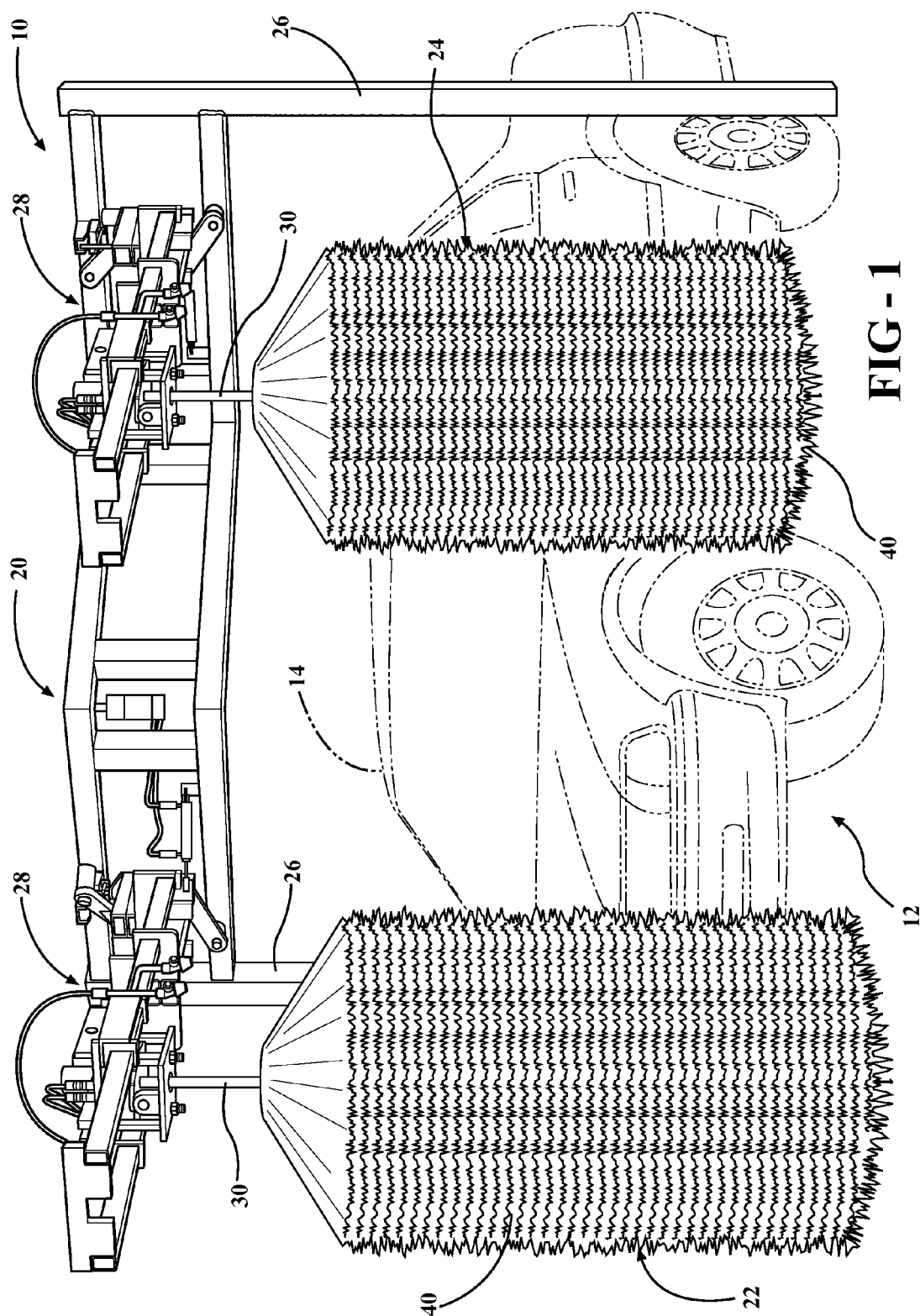
FIG. 1 is a schematic illustration of a drying system for a vehicle wash process in accordance with an aspect of the present disclosure.

The present disclosure relates to a drying system for a vehicle wash system 10. As shown schematically in FIG. 1, the vehicle wash system 10 can be housed in a vehicle wash facility 10 and may include a vehicle treatment area 12, where a vehicle 14 passes for treatment, such as results from a conveyer. It will be appreciated that the vehicle wash facility may employ other mechanism for moving the vehicle 14 therethrough, including a vehicle under its own power. While FIG. 1 generally illustrates a tunnel vehicle wash system, in accordance with another aspect, the vehicle wash may alternatively be of a roll-over type. According to an aspect, the disclosed vehicle wash system may be used to clean cars and trucks, but it could also be employed to clean other types of vehicles. According to an aspect, the vehicle wash system 10 may include a rinse section, a wash section and a drying section. More or less sections may be employed as desired. According to another aspect, each section can include various treatment components to perform the desired treatment functions, such as side brushes located on either side of the vehicle wash area 12 to clean or treat the sides of a vehicle and/or a top brush for cleaning or treating the top of the vehicle. The vehicle wash system 10 may obviously include other components.

Figure 2:
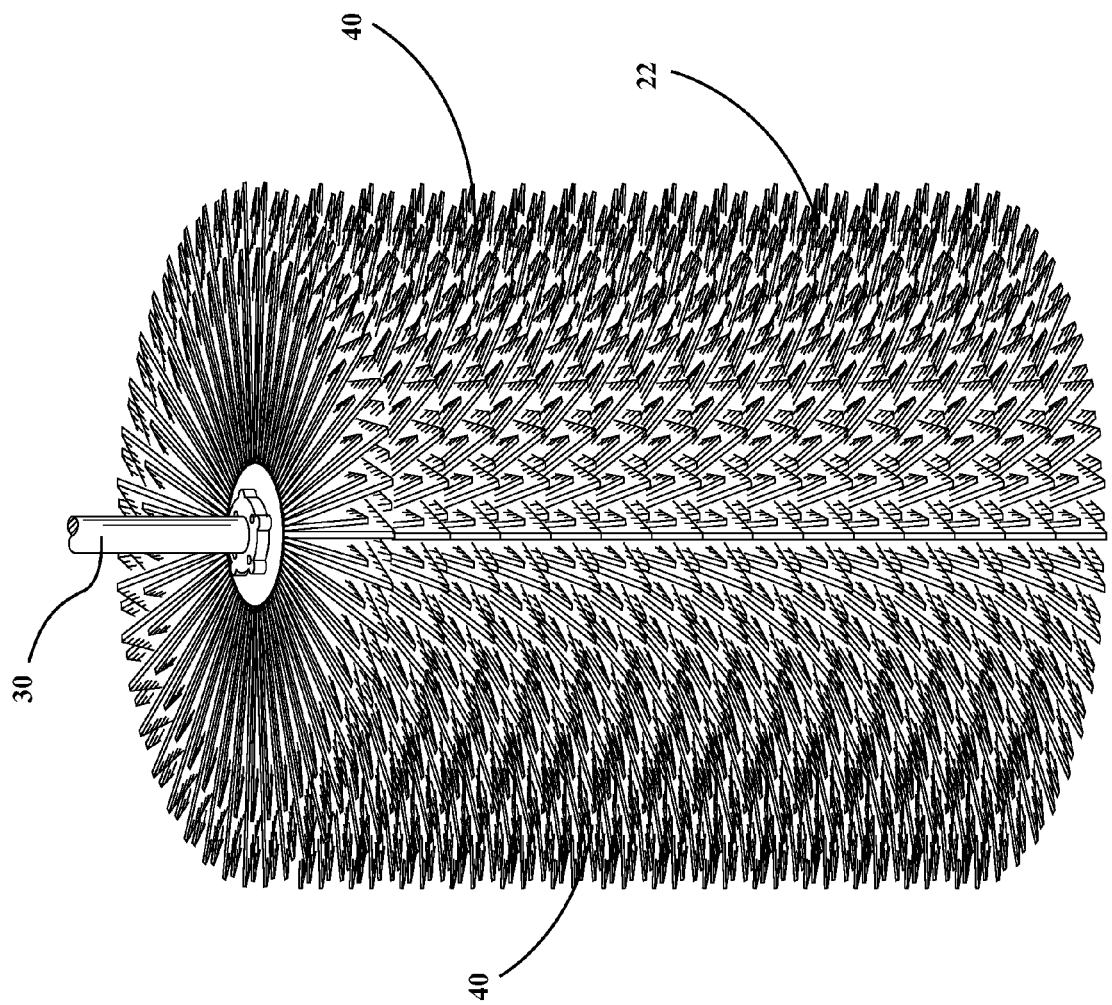
FIG. 2 is a perspective view of a vehicle drying component for a vehicle wash process in accordance with an aspect of the present disclosure.

The present disclosure relates to a drying system 20 for a vehicle wash system 10. According to one aspect shown in FIGS. 1 and 2, the drying system 20 can include a plurality of rotary brushes 22, 24. According to another aspect, the drying system 20 may include one or more top wheels or miter curtains that are designed to cause a plurality of media elements to contact a top exterior surface of a vehicle 14. According to a further aspect, the drying system 20 may replace existing drying systems that include one or more blower assemblies that emit forced air onto the vehicle exterior. Alternatively, the drying system 20 may be employed in connection with existing drying systems to supplement existing drying capabilities. According to a further aspect, the drying system 20 can automate the manual hand towel drying process utilized with existing systems without the additional cost.

According to an aspect, the drying system 20 includes a base structure 26 that supports the drying system 20 within the vehicle wash facility adjacent the path of travel of the vehicle. The base structure 26 is connected to a frame 28, which supports each of the rotary brushes 22, 24. It will be appreciated that the frame 28 can support other types of treatment components. According to a further aspect, the frame 28 may support the respective rotary brush 22, 24 on a hub 30. According to another aspect, the hub 30 may be in electrical communication with a computer and associated control mechanism such that the hub 30 can be rotated under automatic control. The control mechanism could be a computer with a processor or any other suitable control device. According to a further aspect, the frame 28 may be in communication with a computer or control to allow the frame 28 to be pivoted or otherwise translated to bring the rotary brushes 22, 24 into and out of communication with the exterior of the vehicle 14.

According to an aspect, each of the rotary brushes 22, 24 includes a plurality media elements 40 that are configured to contact the vehicle exterior. Each of the media elements 40 can be secured to the hub 30 such they rotate therewith in order to contact and brush against the vehicle exterior. According to a further aspect, the media elements 40 may consist of individual sheets of an absorbent material that are configured into rings. The rings can extend entirely around the circumference of the hub 30 and can be secured thereto. A plurality of these ring-shaped media elements 40 can be stacked one on top of another to form the brush assemblies for the rotary brush 22, 24, as will be understood by one of ordinary skill in the art. According to an aspect, the media elements 40 may be formed of a highly absorbent material. Pursuant to an aspect, the media elements 40 can be formed of a material that has significantly greater absorption capabilities than that of conventional media elements currently employed in vehicle drying processes. According to another aspect, the media elements 40 may be formed of a material that yields a significant increase in absorption capabilities such that the need for the manual hand drying of a vehicle may be eliminated. Pursuant to an aspect, the media elements can be formed of a polyvinyl alcohol based material. Other suitable materials having similar absorption capabilities may also be employed such as other microfiber materials.

According to an aspect, once situated on a vehicle wash component, the media elements 40 may be subjected to a conditioning process to moisten them such that they can be ready for performing drying functions in accordance with this disclosure. According to another aspect, the media elements 40 may be subjected to a conditioning process periodically to keep the media elements 40 moist and damp and prevent them from drying out. The conditioning equipment could be a supply of water or mist that is periodically applied to the media elements 40. Other suitable equipment for keeping the media elements 40 wet or damp could be employed. The degree of frequency at which the conditioning process is employed may vary.

According to an aspect, a water removal device or extractor may also be utilized in the vehicle wash system 10 to remove excess water from the media elements 40 of the rotary brushes 22, 24 as needed. According to an aspect, the water removal device may consist of a beater bar that is placed in communication with the rotary brushes 22, 24 as they are rotating by moving either the beater bar or the rotary brushes 22, 24. As the media elements 40 rotate and engage the beater bar, excess water in the media elements 40 can be removed due to the force of contact therebetween. Alternatively, other suitable water removal devices such as a squeegee, rollers, or a vacuum may be employed. According to a further aspect, the speed of the rotary brushes 22, 24 can be varied such that they are rotating at a higher RPM. Rotating the rotary brushes 22, 24 at a higher RPM will cause water retained in the media elements 40 to be removed through centrifugal force, which will increase the absorption capabilities of the media elements 40. Other suitable ways of removing excess water from the media elements 40 may be employed.

According to an aspect, the water removal device can be employed with any degree of frequency. For example, excess water could be removed from the media elements 40 after every vehicle drying cycle. Alternatively, excess water could be removed from the media elements 40 on a predetermined frequency, i.e., every hour or after a predetermined number of vehicle treatments. According to a still further aspect, the rotary brushes 22, 24 could be in communication with one or more sensors that determine when the water removal process should occur. For example, one of the sensors could be a weight sensor that senses when the weight of the rotary brush exceeds a certain amount, which indicates that it is retaining excess water, which should be removed.

Figure 3:
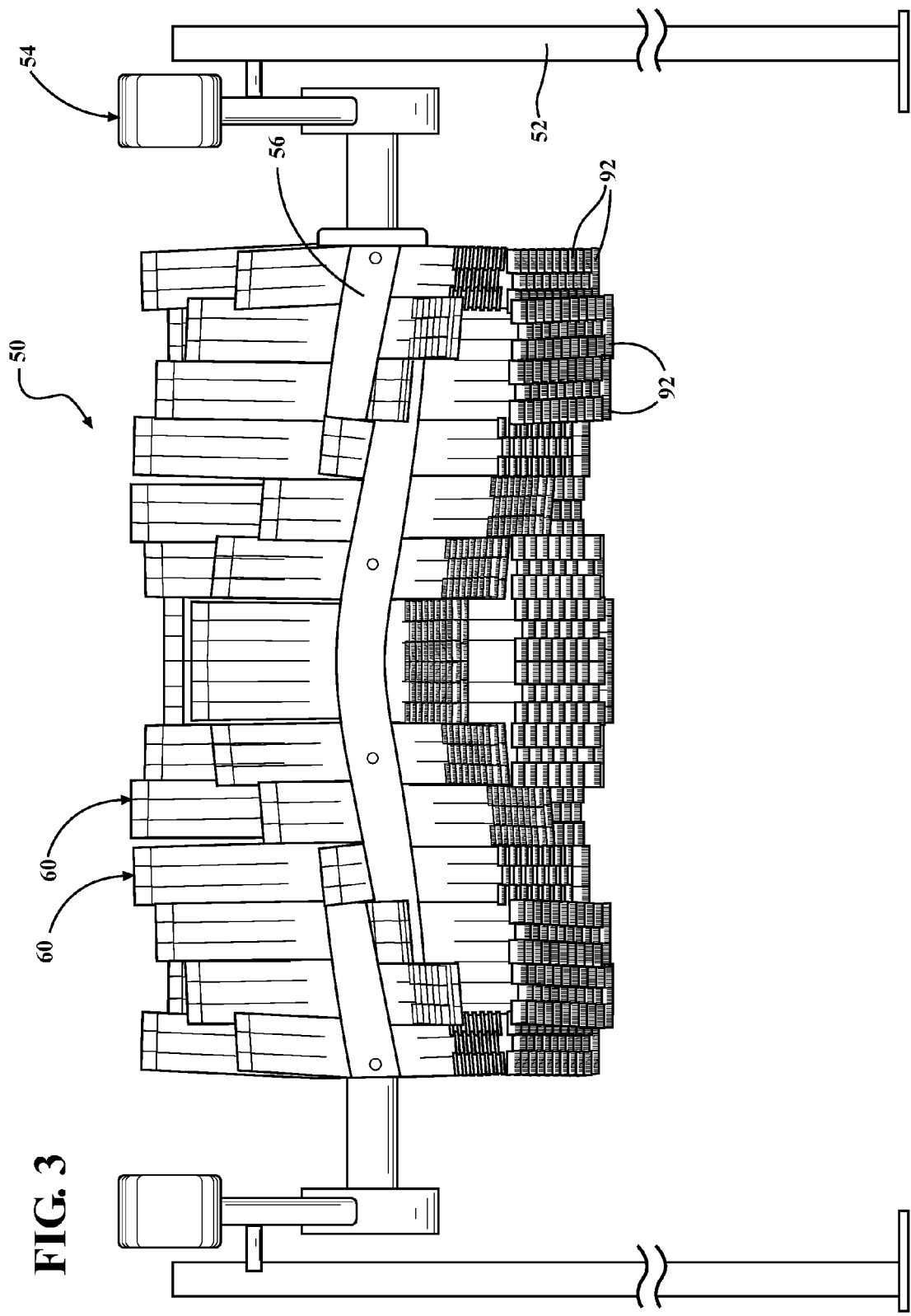
FIG. 3 is a perspective view of a vehicle drying component for a vehicle wash process in accordance with another aspect of the present disclosure.
Figure 4:
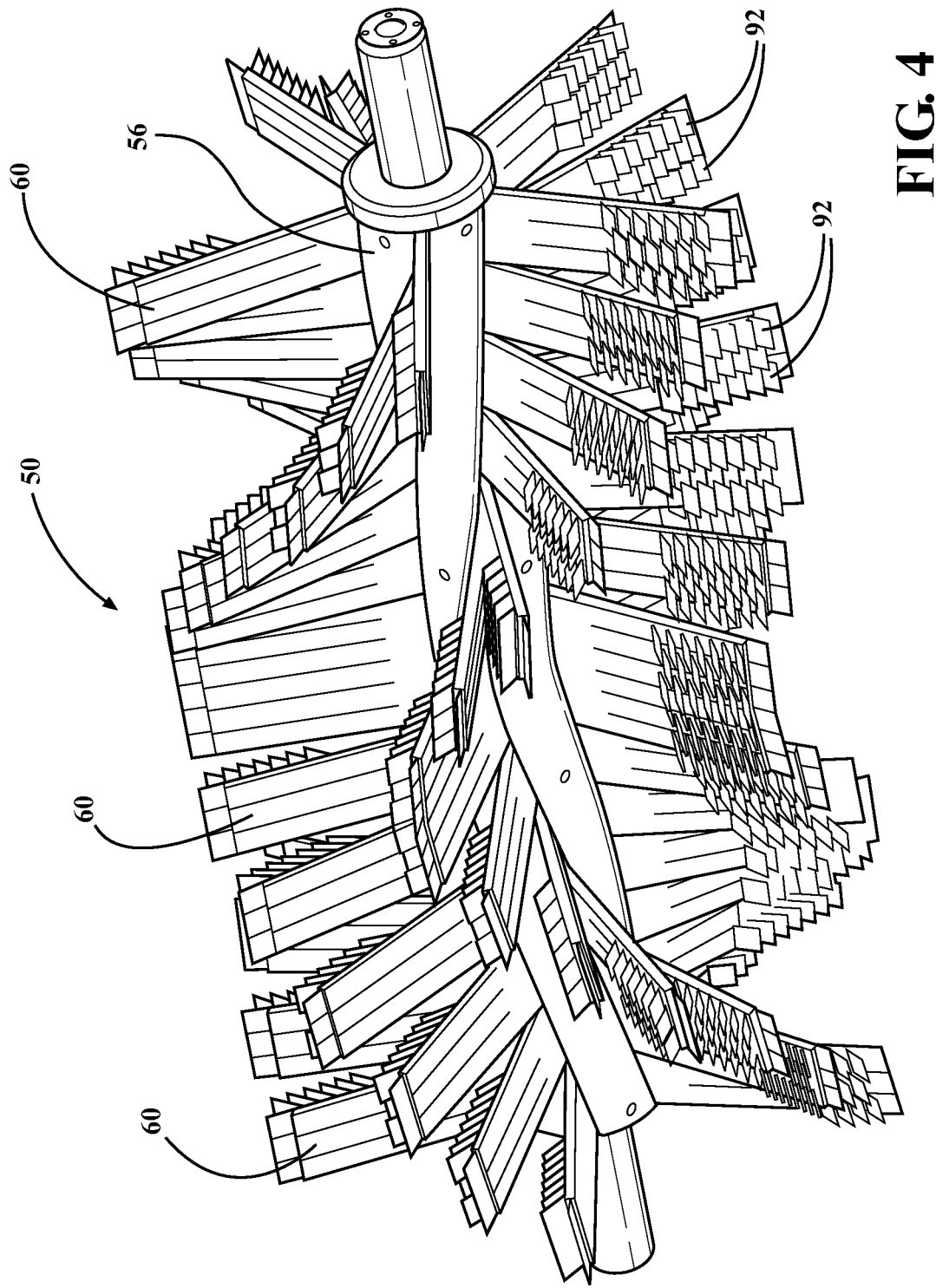
FIG. 4 is a perspective view of a brush assembly for a vehicle drying component in accordance with another aspect of the present disclosure.
Figure 5:
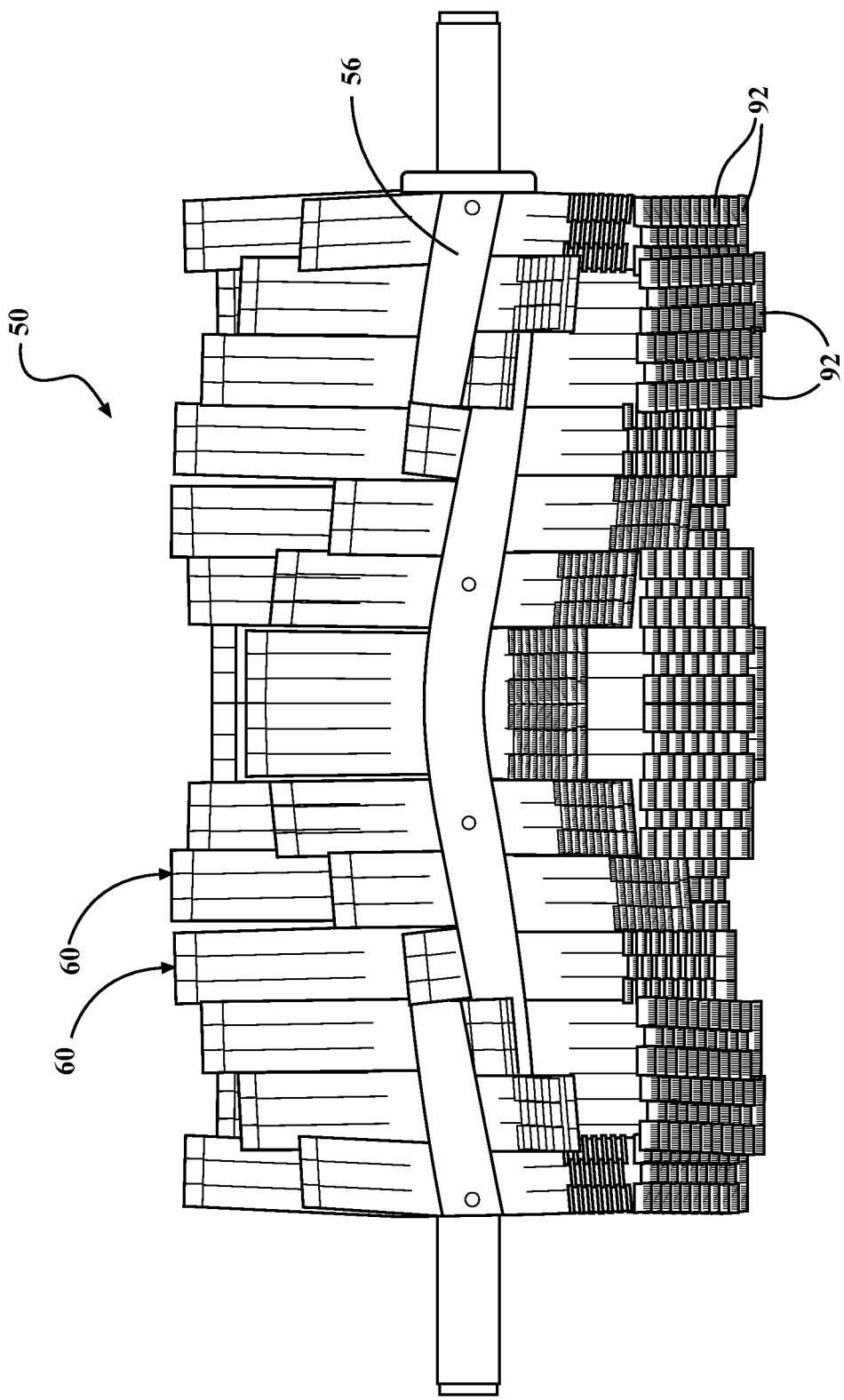
FIG. 5 is a top view of the brush assembly of FIG. 4.

Referring now to FIGS. 3 through 5, which illustrate a drying component 50 for a vehicle wash system 10 in accordance with another aspect of the present disclosure. According to an aspect, the drying component 50 may be part of a drying system, such as discussed above. As shown, the drying component 50 can include a support structure 52 for supporting the drying component 50 within the vehicle wash facility adjacent the path of travel of the vehicle. The support structure 52 can also include a frame 54 connected to the support structure 52 for supporting the drying component 50. According to an aspect, the drying component 50 may be a rotary brush; however, it will be appreciated that the component could take on other configurations such as a miter curtain. Also, the drying component 50 could replace existing components in a vehicle drying system or alternatively, could by employed to supplement existing drying components to improve the drying performance of the vehicle wash system.

According to another aspect, a rotary hub 56 may be supported by the frame 54 and which can be in electrical communication with a computer with associated processor or other control mechanism such that the hub 56 can be rotated under automatic control. The frame 54 may also be in communication with the computer to allow the frame 54 to be pivoted or otherwise moved to bring the component 50 into and out of communication with the exterior of the vehicle.

According to an aspect, the drying component 50 may include a plurality media elements 60 in communication with the rotary hub 56. According to another aspect, the media elements 60 can be secured to the rotary hub 56, including by way of channels and keyholes, such as is disclosed in Applicant's co-pending application Ser. No. 13/668,058, entitled "An Improved Vehicle Wash Component", filed on Nov. 2, 2012 and which is hereby expressly incorporated by reference herein. According to a further aspect, the securement mechanism may consist of separate structures that are secured to the rotary hub 56 such as by welding. According to still a further aspect, the securement mechanism can consist of a welt such as is also disclosed in Applicant's co-pending application Ser. No. 13/668,058. It will also be appreciated that the rotary hub 56 can be constructed in a variety of different lengths as desired and that a variety of different securement mechanism may be employed. According to another aspect, a keyhole attachment part 100, such as is disclosed in FIG. 9 may be employed to secure the media elements to the rotary hub 56. As is shown, the keyhole attachment can be secured at one end of the media elements 60 and retained by a plurality of fastening devices 102. The keyhole attachment 104, includes a plurality of keyhole members that extend therefrom to engage corresponding slots on the rotary hub. It will be appreciated that the rotary hub 56 can be configured to receive the keyhole attachment part 100 and secure the media elements 60 to the rotary hub 56.

Figure 6:
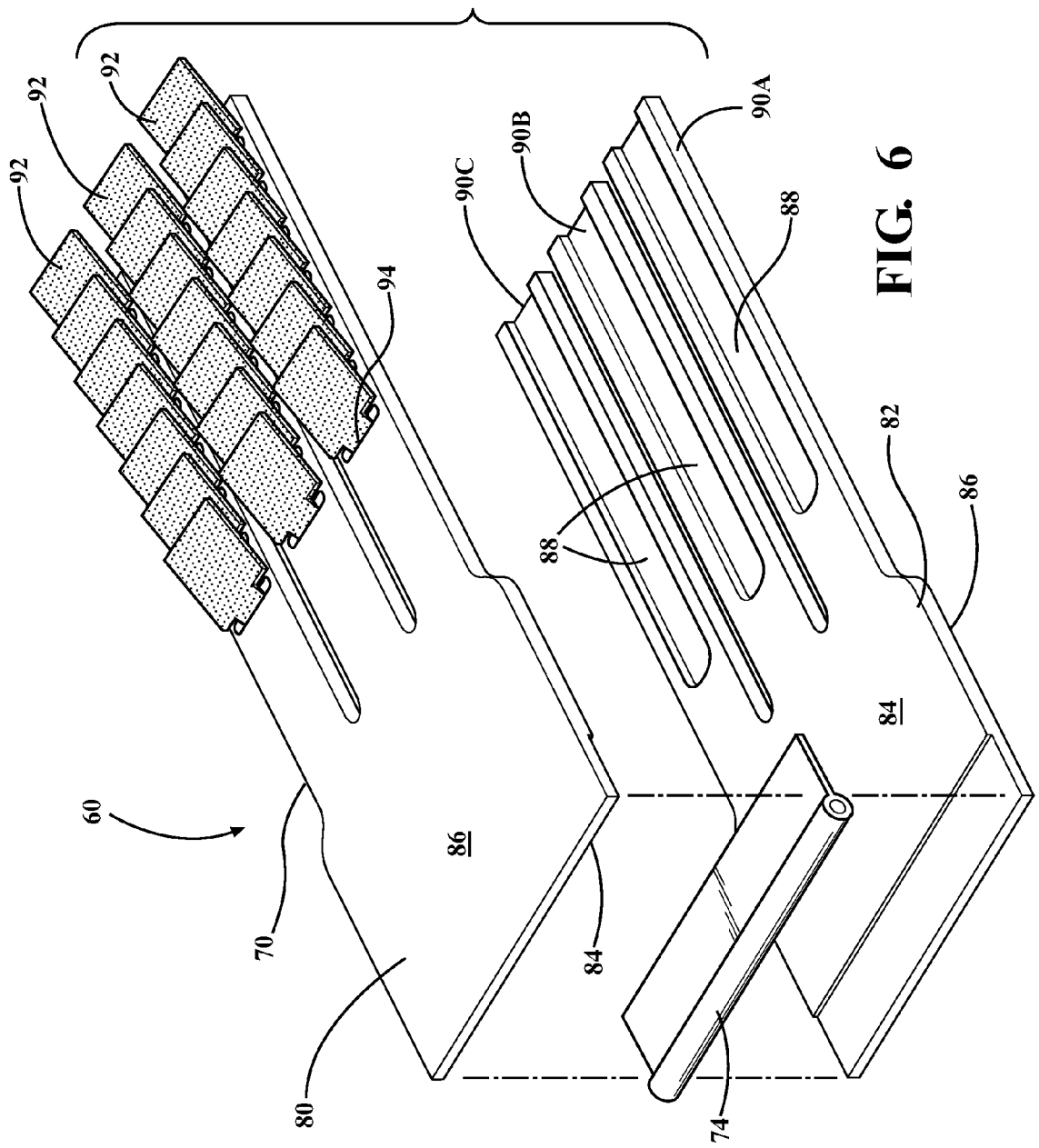
FIG. 6 is an exploded view of a media element for a vehicle drying component in accordance with an aspect of the disclosure.

According to an aspect and with reference to FIGS. 6 through 8, the media elements 60 may be configured to contact the vehicle exterior as the rotary hub 56 rotates. According to another aspect, the plurality of media elements 60 can have the same configuration. Alternatively, they may have varying configurations, lengths or orientations as needed. According to an aspect, the media elements 60 have an elongated configuration and may be constructed of a material that is substantially resilient and self-supporting, such as an EVA foam. According to an aspect, the media elements 60 can be formed of a variety of different materials. The media elements 60 may have a generally rectangular shape and can include a body portion 70 that extends between a first end 72 and a second end 74. According to an aspect, the first end 72 may be in communication with the rotary hub 56, such as by a securement mechanism. The body portion 70 can provide rigidity to the media elements 60 and may be self-supporting along its length to assist in providing sufficient pressure on a vehicle exterior during the vehicle drying process to effectively remove excess water from the vehicle 14.

According to an aspect, the body portion 70 may be constructed of two separate portions that are adhesively bonded together with a cord or bead welt 74 at one end for mounting to a hub or other securement structure. The media element 60 may be utilized in a brush in a tunnel vehicle wash facility. Alternatively, the media element 60 may be employed in a brush for a rollover vehicle wash where the rotation direction of the brush reverses with each pass of the rollover gantry over the vehicle being washed. According to a still further aspect, the media element 60 could be employed in a miter curtain or other vehicle wash component.

As shown, the body portion 70 can include a top ply portion 80 and a bottom ply portion 82 that are mirror images of one another. Each ply portion 80, 82 can have an inner surface 84 and an outer surface 86. The outer surface 86 of each ply portion 80, 82 may include two elongated slots 88 which divide each of the ply portions into elongate parallel fingers 90A, 90B, and 90C. It will be appreciated that the lengths and number of the slots 88 as well as the elongated fingers 90A, 90B, 90C can vary. Also, the slots 88 do not need to be configured to form parallel fingers as they may take on different configurations. According to another aspect, the body portion 70 may consist of a single structure and have different lengths and configurations. According to a further aspect, the body portion 70 may be formed without fingers and/or grooves.

According to another aspect, the body portion 70 can include a plurality of treatment elements 92 located adjacent the second end 74. According to an aspect, the treatment elements 92 may have an elongated configuration and can be formed of a non-rigid material. According to another aspect, the treatment elements 92 can be sewn or otherwise secured to the body portion 70. The treatment elements 92 can be permanently secured or releaseably secured. According to a further aspect, the treatment elements 92 can include a tab portion 94 that extends through an opening in the body portion 70 and which is trapped between the ply portions 80, 82 when they are brought together and adhesively bonded to one another to form the final media element 60. It will be appreciated that more or less treatment elements 92 than those illustrated may be employed. Also, the configuration of the treatment elements 92 as well as their attachment locations can vary. An exemplary treatment element is disclosed in Applicant's co-pending application Ser. No. 13/668,058. Additionally, the treatment element 92 may be an integrally formed structure as opposed to a separately attached structure.

As shown in FIG. 7, in accordance with one aspect, the treatment elements 92 protrude outwardly from only the top ply portion 80 (or only the bottom ply portion 82). However, the treatment elements 92 could protrude outwardly from both the top ply portion 80 and the bottom ply portion 82. The treatment elements 92 on both sides are preferably identical, however they could have different configurations as required. The treatment elements on each side could also vary from one another. The treatment elements can have a variety of different configurations. The media elements 60 are configured such that the treatment elements 92 contact the vehicle exterior to perform a drying function.

According to an aspect, the treatment elements 92 may be separate structure that is formed of a highly absorbent material. Preferably, the treatment elements 92 may formed of a material that has significantly greater absorption capabilities than that of conventional media elements employed in vehicle drying processes. According to another aspect, the media elements 40 are formed of a material that yields a significant increase in absorption capabilities such that the need for manual hand drying of a vehicle may be eliminated. Pursuant to an aspect, the media elements are formed of a polyvinyl alcohol based material. Other suitable materials having similar absorption capabilities may also be employed.

According to an aspect, the brush assembly with the attached media elements is configured to operate at lower RPMs. As set forth in Applicant's co-pending application Ser. No. 13/668,058, the self-supporting nature of the media elements can allow the brush assembly to provide effective drying at lower RPMs because the resting footprint and the rotating footprint are substantially the same regardless of the rotational speed of the brush assembly. This allows the rotational speed of the brush assembly to be varied without altering the working footprint, which provides numerous advantages as enumerated herein. It will be understood that while the present disclosure contemplates rotating the brush assembly 50 at a low RPMs, benefits over the prior art can still be achieved while rotating the brush assembly at high RPMs. According to an aspect, rotating the media elements at a lower RPM provides more of an opportunity to remove water off of the vehicle exterior due to the nature of the slow moving apparatus.

As discussed above, according to an aspect, a vehicle drying component employing media elements in accordance with the present disclosure could be one element of a drying system, including multiple drying elements. For example, one drying element could be a blower assembly, while the other drying element could be configured in accordance with the present disclosure.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any sub combination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A drying component for a vehicle in a vehicle wash process, comprising:
   a base configured to be disposed adjacent a path of travel of a vehicle;
   a plurality of media elements in communication with a frame portion and configured to contact a vehicle exterior to remove excess water therefrom;
   the frame portion in communication with the base and configured to automatically move the plurality of media elements with respect to the vehicle exterior;
   each of the plurality of media elements including at least one treatment element secured thereto, the at least one treatment element being comprised of an absorbent polyvinyl alcohol based material.

2. The component of claim 1, wherein the frame portion is disposed above the path travel of the vehicle.

3. The component of claim 1, wherein the frame portion includes a linearly reciprocating support and wherein the plurality of media elements are secured to the support for reciprocation therewith.

4. The component of claim 1, wherein the frame portion further includes a rotatable hub and wherein the plurality of media elements are secured to the rotatable hub for rotation therewith.

5. The component of claim 4, wherein the plurality of media elements include a keyhole projection at a first end thereof for mating with a keyhole slot on the rotatable hub.

6. The component of claim 4, further comprising:
   a plurality of treatment elements and wherein each of the treatment elements is comprised of an absorbent polyvinyl alcohol based material.

7. The component of claim 6, wherein the plurality of media elements have a resilient self-supporting body portion that is comprised of a different material than the treatment elements; and
   wherein a footprint defined by an outer ends of the plurality of media elements is substantially the same regardless of the speed at which the rotary hub is operated.

8. The component of claim 7, wherein the treatment elements are permanently secured to the body portion of the plurality of media elements.

9. The component of claim 7, wherein the treatment elements are disposed adjacent the outer ends of the plurality of media elements.

10. The component of claim 7, wherein the body portion is constructed of an EVA foam.

11. A drying system for a vehicle wash, comprising:
a first brush assembly, including a rotary hub;
a frame for supporting the first brush assembly, the frame configured to be located adjacent a vehicle treatment area;
a plurality of elongated media elements secured to the rotary hub and configured to contact a vehicle exterior;
each of the plurality of media elements having a body portion constructed of an, absorbent, resilient self-supporting material that extends in a direction substantially perpendicular to an axis of rotation of the rotary hub when the brush assembly is rotating at low RPMs; and
at least one treatment element secured to the body portion, the at least one treatment element comprised of a polyvinyl alcohol based material for removing excess water from the vehicle exterior.

12. The drying system of claim 11, further comprising:
a plurality of treatment elements which are each comprised of a polyvinyl alcohol based material.

13. The drying system of claim 12, wherein the plurality of treatment elements are formed of a separate material than the body portion and are secured to the body portion in a half remote from a connection to the rotary hub.

14. The drying system of claim 13, wherein the body portion of each of the plurality of media elements is formed of an EVA foam.

15. The drying system of claim 11, further comprising:
a second brush assembly disposed on one side of the vehicle treatment area opposite the first brush assembly.

16. The drying system of claim 15, further comprising:
a third brush disposed above the vehicle treatment area for contacting an upper exterior surface of the vehicle.

17. The drying system of claim 11, further comprising:
at least one blower assembly for blowing water off the vehicle exterior.

18. A method of drying an exterior surface of a vehicle in a vehicle wash facility, comprising:
providing a brush assembly configured to be disposed adjacent a vehicle treatment area;
providing a plurality of resilient self-supporting media elements about a circumference of the brush assembly and wherein an outer end of the plurality of media elements defines a footprint;
securing at least one absorbent treatment element adjacent the outer end of each of the plurality of media elements wherein the absorbent material consists of a polyvinyl alcohol based material;
rotating the brush assembly at a low RPMs so that the at least one treatment element on each of the plurality of media elements engages an exterior surface of the vehicle and removes excess water therefrom.

19. The method of claim 18, further comprising:
conditioning the at least one treatment element to keep it hydrated.

20. The method of claim 18, further comprising:
extracting water from said at least one treatment element.

21. The drying system of claim 11, further comprising:
a water removal device disposed configured to be disposed adjacent the vehicle treatment area and further configured to engage the plurality of media elements to remove excess water therefrom.

22. The drying system of claim 21, wherein the water removal device is a beater bar.

* * * * *